US008688597B2

(12) United States Patent  
Sickmiller

(10) Patent No.: US 8,688,597 B2  
(45) Date of Patent: Apr. 1, 2014

(54) JOB-MANAGEMENT SYSTEMS

(76) Inventor: David Sickmiller, Grandviller, MI (US)

(*) Notice: Subject to any disclaimer, the term of this patent is extended or adjusted under 35 U.S.C. 154(b) by 193 days.

(21) Appl. No.: 13/284,706

(22) Filed: Oct. 28, 2011

(65) Prior Publication Data

US 2013/0110734 A1 May 2, 2013

(51) Int. Cl.
G06Q 10/10 (2012.01)
G06Q 10/06 (2012.01)
G06Q 30/08 (2012.01)
G06Q 10/00 (2012.01)
G06Q 30/02 (2012.01)

(52) U.S. Cl.
USPC .............................. 705/321; 705/1.1; 705/320

(58) Field of Classification Search
USPC .................................................. 705/1.1–912
See application file for complete search history.

(56) References Cited

U.S. PATENT DOCUMENTS

2002/0091689 A1* 7/2002 Wiens et al. ...................... 707/6
2006/0206448 A1* 9/2006 Hyder et al. ...................... 707/1
2007/0233547 A1* 10/2007 Younger et al. ................. 705/9
2010/0169960 A1* 7/2010 Davies et al. ................... 726/7
2010/0179916 A1* 7/2010 Johns et al. .................. 705/319

OTHER PUBLICATIONS

JobGizmo,[online], [retrieved on Feb. 7, 2012], Browser Widget, Retrieved from: http://jobgizmo.com/browserwidget/.
Jobpad, [online], [retrieved on Feb. 7, 2012], find, store, and organize all aspects of job hunting, Retrieved from: www.jobpadhq.com.
Huntsy, [online], [retrieved on Feb. 7, 2012], organization to find employment, Retrieved from: http://beta.huntsy.com.

* cited by examiner

Primary Examiner — Jonathan Ouellette
(74) Attorney, Agent, or Firm — Mohr Intellectual Property Law Solutions, PC

(57) ABSTRACT

Computer implemented job-management systems for adding employment seeking features to computer applications showing job data and receiving input. Systems may include a data storage system, instruction data including computer readable instructions, and a processor configured to execute the instruction data. In some examples, the instruction data may include an interface component for interfacing with from the computer application to capture input and job data and displaying a user interface. In some examples, the instruction data may include a storage component for storing data to the data storage system, the data including the input. Some examples may include a retrieval component for retrieving saved data from the data storage system and an interface component including computer executable instructions for entering the retrieved saved data into the form. In some examples the computer application may be configured to receive communication input and to send the communication input to an employer contact.

22 Claims, 6 Drawing Sheets

JOB-MANAGEMENT SYSTEMS

BACKGROUND

The present disclosure relates generally to job-management systems. In particular, job-management systems for adding employment seeking features to a computer application are described.

Known systems for organizing one's job search are not entirely satisfactory for the range of applications in which they are employed. Existing job-management systems often fail to intuitively manage a user's job search, as they often lack automatic storage of job-related data and require a user to manage job data in a stand-alone application.

Many job-management systems operate as stand-alone applications. Because users often conduct the bulk of their job-seeking within web browser windows, e-mail clients, or other applications of general utility, they often neglect to use the stand-alone system. As these applications are often at the center of a user's daily activities, using them to perform job-seeking tasks is often more convenient than opening a separate, standalone job-management system.

Additionally, users accomplish a large share of employment tasks in a web or e-mail context. As a result, stand-alone job-management systems may be unnecessary and inconvenient. Because users often neglect to use stand-alone job-management systems, they often fail to properly track job-search related tasks. As a result, users often manage their job search poorly.

Additionally or alternatively, stand-alone applications often fail to adequately remind users of upcoming related tasks and recommend open positions. Because job-seeking is often conducted through web and e-mail contexts, reminders and recommendations conveyed through a standalone program may go unnoticed. Missing these reminders and recommendations may result in inadvertent forfeiture of a desired employment position.

Thus, there exists a need for job-management systems that improve upon and advance the design of known job-management systems. Specifically, there exists a need for job-management systems that; directly interface with the other computer applications commonly used for job seeking purposes, such as web browsers and e-mail clients. Providing job-seeking features in this context would improve the user's job-management, and would assist in the user in ultimately receiving a job. Examples of new and useful job-management systems relevant to the needs existing in the field are discussed below.

SUMMARY

Computer implemented job-management systems for adding employment seeking features to computer applications showing job data and receiving input. Systems may include a data storage system, instruction data including computer readable instructions, and a processor configured to execute the instruction data. In some examples, the instruction data may include an interface component for interfacing with from the computer application to capture input and job data and displaying a user interface. In some examples, the instruction data may include a storage component for storing the input and job data to the data storage system. Some examples may include a retrieval component for retrieving saved data from the data storage system and an interface component including computer executable instructions for entering the retrieved saved data into the form. In some examples the computer application may be configured to receive communication input and to send the communication input to an employer contact.

BRIEF DESCRIPTION OF THE DRAWINGS

Figure 3:
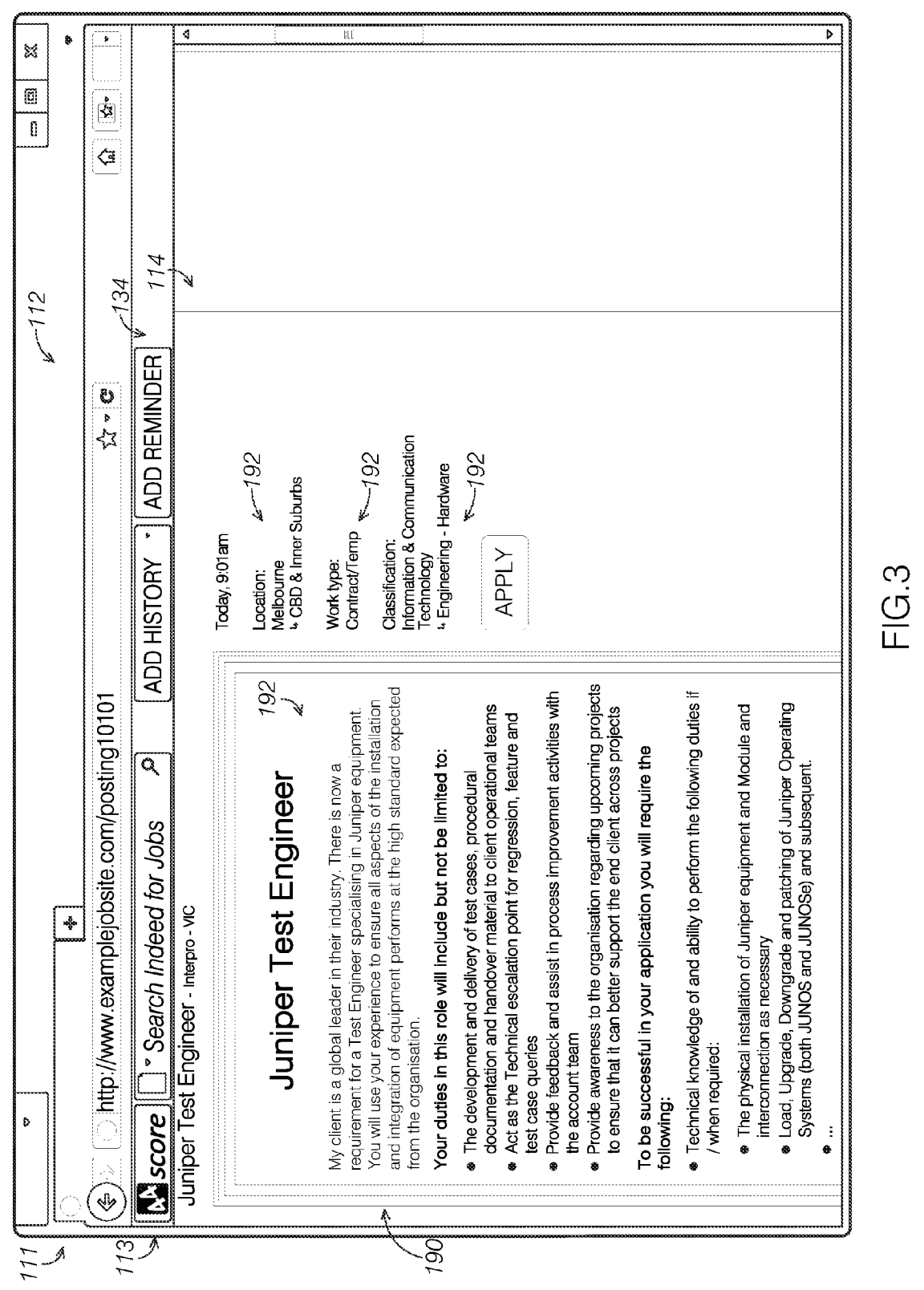

FIG. 3 is a screenshot of the job-management system shown in FIG. 1 interfacing with a computer application and displaying a toolbar, the computer application displaying job data and a form.

FIG. 4 is a screenshot of the job-management system shown in FIG. 1 interfacing with a computer application and displaying a toolbar, the computer application displaying job data and a form.

FIG. 5 is a screenshot of the job-management system shown in FIG. 1 interfacing with a computer application and displaying a toolbar, the job-management system displaying a confirmation element.

DETAILED DESCRIPTION

The disclosed job-management systems will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various job-management systems are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Figure 1:
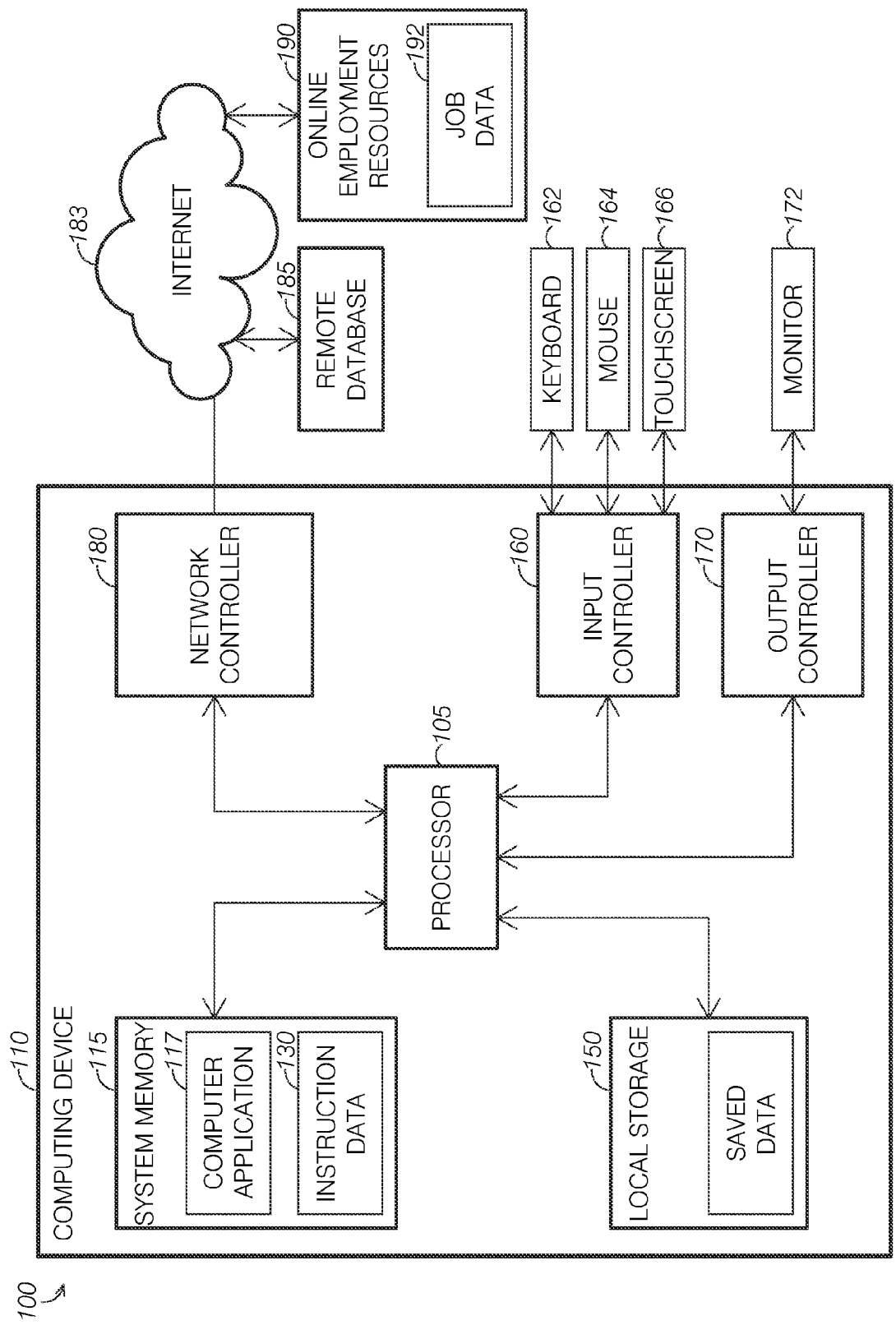
FIG. 1 is a schematic view of a first example of a job-management system.

With reference to FIGS. 1-6, a first example of a computer implemented job-management system, system 100, will now be described. As FIG. 1 shows, system 100 includes a processor 105, system memory 115, local storage 150, an input controller 160, an output controller 170, and a network controller 180. Processor 105, system memory 115, local storage 150, input controller 160, output controller 170, and network controller 180 may collectively be referred to as a computing device 110. Computing device 110 may be incorporated within a variety of consumer electronic devices, such as personal media players, cellular phones, smart phones, personal data assistants, global positioning system devices, and the like.

Processor 105 may be any type of processing device for executing software instructions, but will conventionally be a microprocessor device. System memory 115 may include both read-only memory (ROM) and random access memory (RAM). As will be appreciated by those of ordinary skill in the art, both read-only memory (ROM) and random access memory (RAM) may store software instructions to be executed by processor 105. Processor 105 additionally allows executed instruction data to communicate with other devices directly and indirectly connected to processor 105. Processor 105 may, for example, allow instruction data to read and write from local storage 150 and allow a user to control executed applications via input controller 160.

Processor 105 and system memory 115 are connected, either directly or indirectly, through a bus or alternate communication structure to one or more peripheral devices. These devices include, but are not limited to, local storage 150, input controller 160, output controller 170, network controller 180.

Local storage 150 includes any locally-connected devices in which processor 105 may store and retrieve computer data without accessing a computer network. Local storage 150 may include, for example, a hard disk drive, a removable optical disk drive, a removable magnetic disk drive, or a flash memory card.

Input controller 160 is configured to communicate instructions from various input devices, which may include, but are not limited to, a keyboard 162, a mouse 164, and a touch-screen 166. Processor 105 may use received instructions to control executed instruction data. Output controller 170 may include, for example, a monitor 172, an integrated display, television, printer, stereo, or speakers. Processor 105 and output controller 170 allow executed instruction data to render output to devices connected via output controller 170.

As FIG. 1 illustrates, processor 105 is connected to network controller 180 to communicate with a computer network 183. As FIG. 1 shows, computer network 183 includes connection to computer network 183, which is the internet in this example. Network controller 180 is configured to communicate with any local- or wide-area networks, however. Network controller 180 may communicate via wired connections, wireless connections, or any combination thereof.

Network controller 180 may also communicate using one or more communication protocols, such as the Transmission Control Protocol (TCP), the Internet Protocol (IP), and the User Datagram Protocol (UDP). These protocols are well known in the art, and thus will not be discussed here in more detail. Network controller 180, for the purposes of this disclosure, is not limited to a single attached device; network controller 180 may, for example, include separate wired and wireless network interfaces through which processor 105 may simultaneously or separately communicate with computer network 183.

It should be appreciated that, in addition to the input, output and storage peripheral devices specifically listed above, the computing device may be connected to a variety of other peripheral devices, including those that perform input, output and storage functions, or some combination thereof. For example, the computing device 110 may be connected to a digital music player, such as an IPOD® brand digital music player or IPHONE or Droid brand smartphone available from Apple, Inc. of Cupertino, Calif. As known in the art, this type of digital music player can serve as both an output device for a computer (e.g., outputting music from a sound file or pictures from an image file) and a storage device.

In addition to a digital music player, computing device 110 may be connected to or otherwise include one or more other peripheral devices, such as a telephone. The telephone may be, for example, a wireless "smart phone." As known in the art, this type of telephone communicates through a wireless network using radio frequency transmissions. In addition to simple communication functionality, a "smart phone" may also provide a user with one or more data management functions, such as sending, receiving and viewing electronic messages (e.g., electronic mail messages, SMS text messages, etc.), recording or playing back sound files, recording or playing back image files (e.g., still picture or moving video image files), viewing and editing files with text (e.g., Microsoft Word or Excel files, or Adobe Acrobat files), etc. Because of the data management capability of this type of telephone, a user may connect the telephone with computing device 110 so that their data maintained may be synchronized.

Of course, still other peripheral devices may be included with or otherwise connected to a computing device 110 of the type illustrated in FIG. 1, as is well known in the art. In some cases, a peripheral device may be permanently or semi-permanently connected to computing device 110. For example, with many computing devices, processor 105, local storage 150, and a display are semi-permanently encased in a single housing.

Still other peripheral devices may be removably connected to computing device 110, however. Computing device 110 may include, for example, one or more communication ports through which a peripheral device can be connected to processor 105 (either directly or indirectly through a bus). These communication ports may thus include a parallel bus port or a serial bus port, such as a serial bus port using the Universal Serial Bus (USB) standard or the IEEE 1394 High Speed Serial Bus standard (e.g., a Firewire port). Alternately or additionally, computing device 110 may include a wireless data "port," such as a Bluetooth® interface, a Wi-Fi interface, an infrared data port, or the like.

It should be appreciated that a computing device employed according various examples of the invention may include more components than computing device 110 illustrated in FIG. 1, fewer components than computing device 110, or a different combination of components than computing device 110. Some implementations of the invention, for example, may employ one or more computing devices that are intended to have a very specific functionality, such as a digital music player or server computer. Some implementations of the invention may alternately or additionally employ computing devices that are intended to be capable of a wide variety of functions, such as a desktop or laptop personal computer. These computing devices may have any combination of peripheral devices or additional components as desired.

As FIG. 1 shows, system memory 115 stores computer executable instructions defining a computer application 117. As FIG. 1 illustrates, computer application 117 instructs processor 105 to communicate with computer network 183 via network controller 180 to retrieve job data 192 from an online employment resource 190. As FIG. 3 shows, computer application 117 displays job data 192 within an application interface 112. In the example illustrated in FIGS. 1-6, computer application 117 is a web browser used to retrieve job data 192 from an employment website on the World Wide Web. Computer application 117 renders job data 192 within a browser window 113's rendering window 114 contained in application interface 112. The online employment resource currently loaded in rendering window 114 is the current online employment resource.

Although computer application 117 is a web-browser in the example illustrated in FIGS. 1-6, other applications commonly used in employment searching may serve as the computer application. E-mail applications, for example, may be used. Web-based e-mail applications, such as Gmail, are also considered for use.

Figure 4:
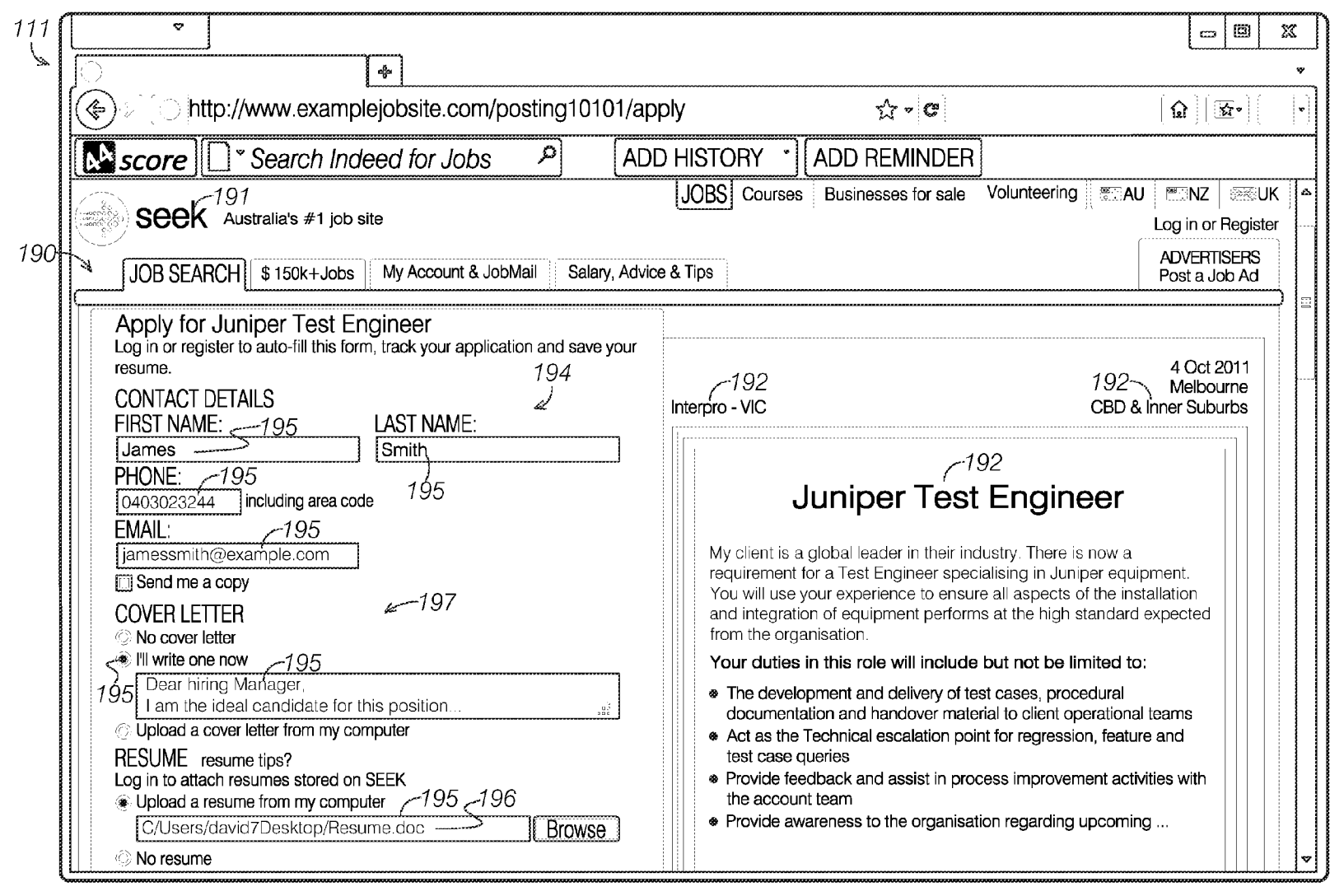

Turning to FIG. 4, computer application 117 also presents a job application form 194 requesting user input in response to job data 192. Form 194 is displayed within rendering window 114's depiction of the current online employment resource. In website-based examples, form 194 may be on a different webpage than some or all relevant job data 192.

As FIG. 3 shows, job data 192 may include any of the information from online employment; resources relating to an employment position. Most job data 192 that relates to an employment position will be retrieved from a single online employment resource, but this is not required. Job data relating to an employment position often includes duties and responsibilities, qualifications, title of the position, name and location of the employer, the corresponding online employment resource, and other information commonly found in a job posting.

FIG. 4 illustrates that form 194 is configured to retrieve form input 195 from a user in response to job data 192. FIG. 4 illustrates form 194 as a web form; however, other means of retrieving user input may equally serve as forms. As FIG. 4 illustrates, form input 195 includes all of the data requested from the user within form 194. Form input 195 may include simple text entry, file attachments (such as file attachment 196), or other understood input means.

While computer application 117 is generally used when operating system 100, computer application 117 is not an element of system 100. Rather, system 100 interfaces with computer application 117 (or another application commonly used in employment searching) showing job data and a receiving user input in response to the displayed job data. In some examples, tools such as a plug-in interface or application programming interface (API) allow system 100 to easily interface with computer application 117. Such tools, however, are not required. As an example, systems that run separately alongside computer application 117 and that are configured to automatically interface with computer application 117 are equally within this disclosure.

As FIG. 1 illustrates, system memory 115 also stores instruction data 130 configured to be executed by processor 105. Instruction data 130 may have been retrieved from local storage 150 or from computer network 183 prior to execution. For example, some disclosed systems may store instruction data on a local hard drive or on data storage accessible via the internet before execution. In the example illustrated in FIGS. 1-6, instruction data 130 defines a web-browser plugin stored on local storage 150, moved to system memory 115, and executed by processor 105 to interface with computer application 117 as a browser plugin.

Figure 2:
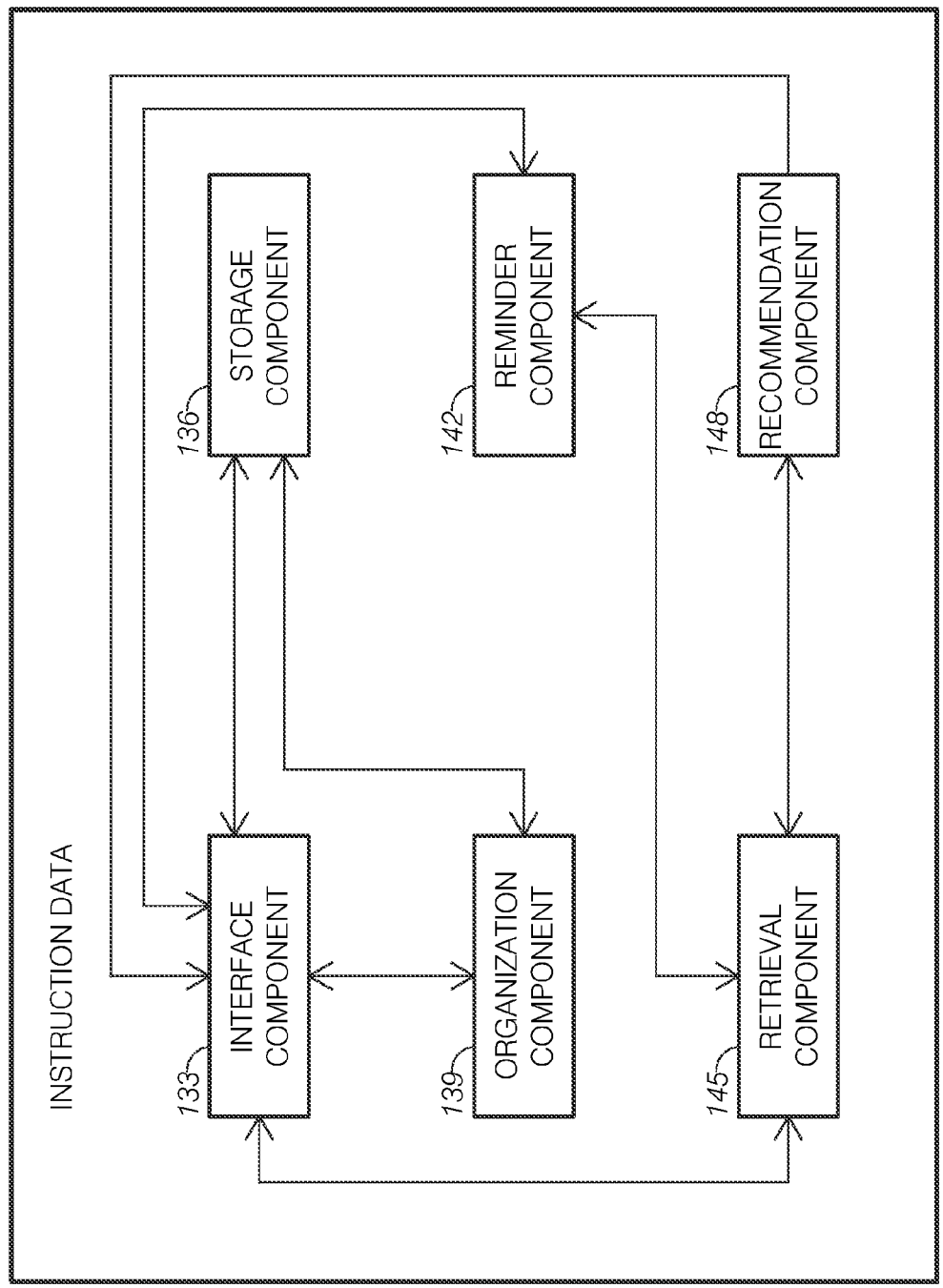
FIG. 2 is a schematic view of instruction data of the job-management system shown in FIG. 1.

As FIG. 2 shows, instruction data 130 includes an interface component 133, a storage component 136, a retrieval component 145, an organization component 139, a reminder component 142, and a recommendation component 148. Processor 105 executes instruction data 130 to add employment seeking features to a computer application. Processor 105 may, for example, execute instruction data 130 as a standalone application, as a plug-in executed within the computer application, or as a web application stored online until execution.

Interface component 133 includes computer executable instructions for interfacing with computer application 117. Interface component 133 allows system 100 to interact and communicate with computer application 117. For example, interface component 133 provides a data connection with computer application 117, whereby system 100 may capture form input 195 and job data 192. After this information is captured, it may be used by any of system 100's components.

Figure 5:
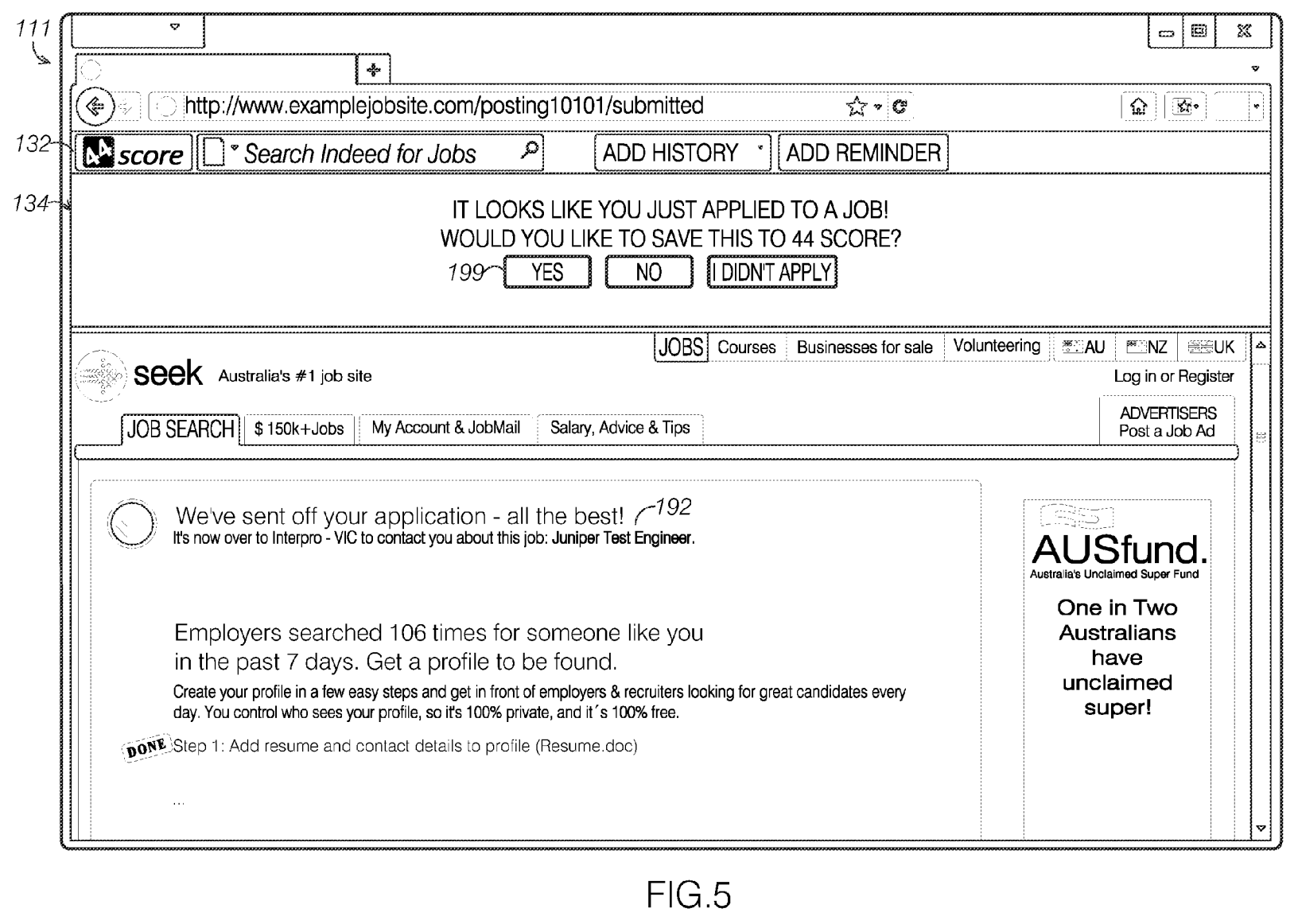
Figure 6:
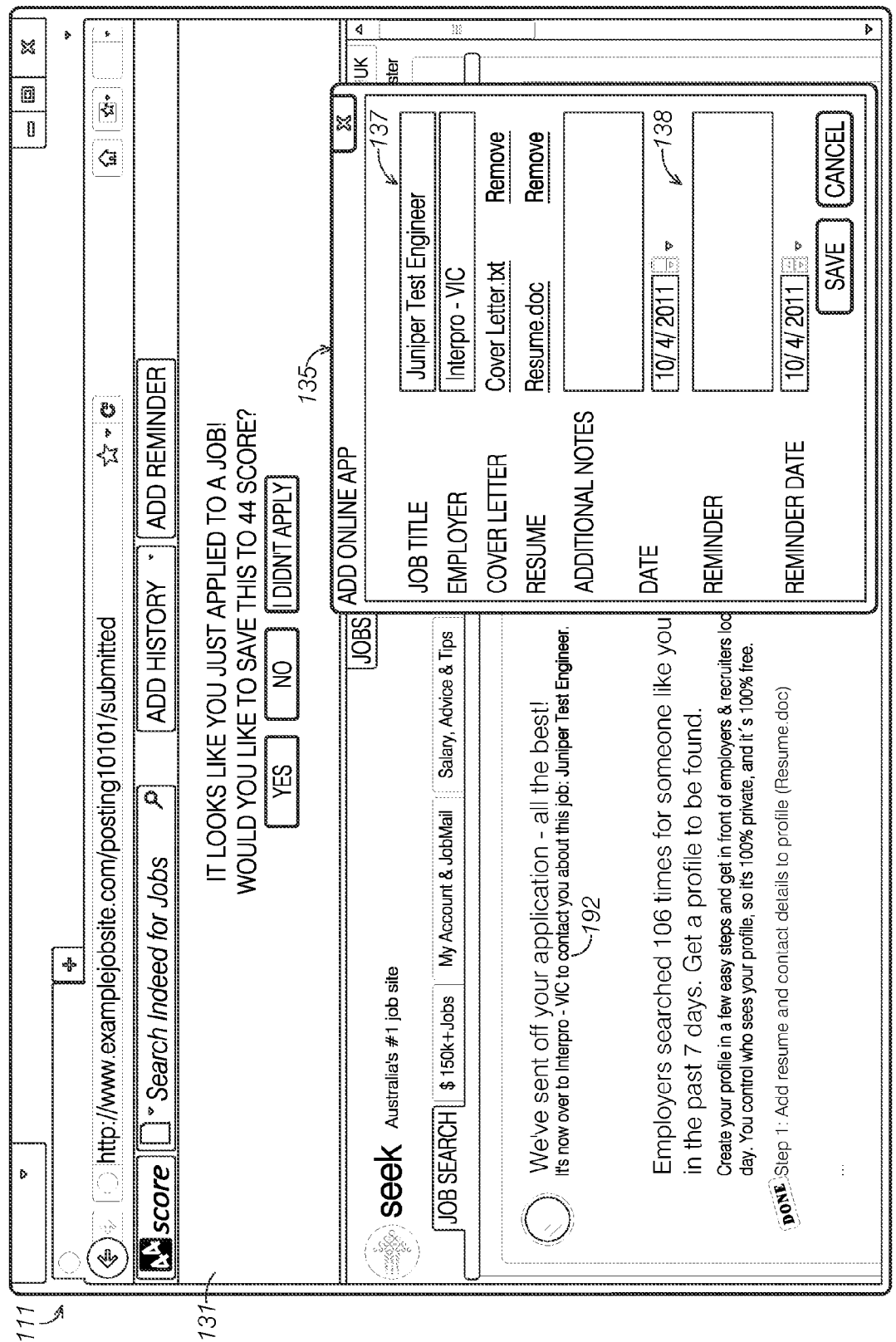
FIG. 6 is a screenshot of the job-management system shown in FIG. 1 interfacing with a computer application and displaying a toolbar, the job-management system displaying a supplemental interface.

As FIGS. 5 and 6 illustrate, interface component 133 displays a user interface 134 within application interface 112. In the example illustrated in FIGS. 1-6, interface component 133 includes a toolbar 132 displayed in browser window 113. User interface 134 may additionally include other elements, such as a pop-up toolbar 131 or a dialog 135.

User interface 134 may also include a confirmation element displayed individually or within another element. Such a confirmation element may receive user confirmation to store employment search related data. For example, user interface 134 includes confirmation element 199 below toolbar 132.

As FIG. 6 shows, user interface 134 may include a supplemental form 137. Supplemental form 137 requests supplemental input 198 potentially corresponding to job data 192. Supplemental input 198 may be stored along with job data. Supplemental form 137 may be displayed, partially or wholly, within one or more of user interface 134's elements.

Supplemental form 137 may request, for example, scheduling data 138. As FIG. 6 shows, scheduling data 138 may include a reminder time when a user desires to be reminded about a future scheduled task on a reminder date. Scheduling data 138 may also include notes corresponding to the scheduled task. Scheduled tasks often relate to an employment search, but this is not specifically required. Examples of scheduled tasks may include following up with an employer or scheduling an employment interview. In some examples, scheduling data 138 may include multiple reminder times when a user would like to be notified multiple times before a task is due.

As FIG. 2 illustrates, instruction data 130 includes a storage component 136 including computer executable instructions for storing saved data to a data storage system. The data storage system may include, for example, local storage 150 or remote storage 185 connected through a computer network. Storage component 136 may store the saved data after form input has been entered into form 194, for example: upon submission of form 194, as a user enters data in form 194, or after interface component 133 receives user confirmation.

Saved data may include captured data and data entered into supplemental form(s), and may include, for example, job data 192, form input 195, supplemental input 198, scheduling data 138, and other data acquired over the course of an employment search. Storage component 136 stores the saved data for use in future employment seeking tasks.

Instruction data 130 additionally includes organization component 139, which includes computer executable instructions for using job data to index the saved data. For example, organization component 139 may be used to index saved data according to selected criteria, which may include job field, job title, employer, or other relevant information. Organization component 139 may also index saved data according to supplemental input.

Instruction data 130 also includes retrieval component 145 including computer executable instructions for retrieving saved data from the data storage system to be used in employment seeking tasks. For example, retrieval component 145 may retrieve data corresponding to previous employment tasks associated with a previous online employment resource, such as job data, form input entered by a user in the job application form associated with a previous online employment resource, supplemental input, scheduling data, and other relevant information. This retrieved data associated with a previous online employment resource may be used, for example, to automatically complete form input on a job application form associated with a current online employment resource, saving time and effort.

In some examples, the retrieved saved data may include a file attachment, such as file attachment 196. In some examples, retrieval component 145 communicates retrieved data as a file attachment when the data was not stored as such. For example, the form input 195 corresponding to cover letter 197 may be retrieved as a file attachment despite die fact that; form 194 requested it as standard text input.

Reminder component 142 uses scheduling data 138 retrieved from the data storage system by retrieval component 145 to communicate a notification at a selected time. The scheduling data 138 may correspond to user input entered into a supplemental form, similar to scheduling data 138 illustrated in FIG. 6. When the reminder time arrives, reminder component 142 communicates a notification relating to an upcoming scheduled task to a user. This notification may include, for example, job data, form input due date(s), reminder dates, or other relevant information. Reminder component 142 may notify via a dialog window, an e-mail, a text message, an audio clip, or any other additional or alternative form of electronic communication. In relevant examples, providing notifications within commonly used applications, such as web browsers or e-mail clients, a user is more likely to receive proper and timely notification.

Recommendation component 148 uses data retrieved from the data storage system to recommend employment prospects and job-management related tasks. If a user, for example, has saved data corresponding to several engineering positions, recommendation component 148 may recommend an additional or alternative engineering position to the user via a notification (as described in the previous paragraph). Retrieval component 145 may connect to computer network 183 to retrieve job data corresponding to other employment positions and tasks and relate the job data with the retrieved data to generate recommended job information, which corresponds to recommended employment positions, employment tasks, and other recommended information. By integrating job recommendation functionality with commonly used applications, such as web browsers or e-mail clients, users are more likely to receive proper notification of recommended information.

System 100 is not particularly tailored to interface with a particular employment resource. For example, system 100 may interface with common internet employment resource websites, such as Seek.com.au, Monster.com, and the like. System 100 may additionally implement resource-specific features to interface more fully or more elegantly with that particular resource. However, disclosed job-management systems are not limited to those that implement such resource-specific features.

In some examples, including systems that interface with web browsers and e-mail applications, the computer application may receive communication input and send communication input to an employer contact. In this context, communication input may refer to any information that may be sent to an employer contact, including the body of an e-mail or form input.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. A computer implemented job-management system for adding employment seeking features to a computer application, the computer application displaying an application interface showing job data and a job application form for receiving form input, the job data and the job application form being associated with a first online employment resource, the system comprising:
    a data storage system;
    instruction data stored on a computer readable medium, the instruction data including:
        an interface component including computer executable instructions for:
            interfacing with the computer application to capture form input, the form input being entered by a user in the job application form associated with a first online employment resource, and job data from the computer application; and
            displaying a user interface in the application interface;
        a storage component including computer executable instructions for storing saved data to the data storage system after form input has been entered, the saved data including captured form input data entered in the job application form associated with the first online employment resource; and
        a retrieval component configured to:
            retrieve saved data corresponding to the first online employment resource when the computer application is currently accessing a second online employment resource; and
            automatically enter the retrieved saved data corresponding to the first online employment resource in a job application form associated with the second online employment resource; and
    a processor configured to execute the instruction data.

2. The job-management system of claim 1, wherein the storage component is configured to store saved data relating to multiple distinct online employment resources.

3. The job-management system of claim 1, wherein:
    the interface component displays a confirmation element for receiving user confirmation; and
    the storage component stores the saved data upon receiving user confirmation.

4. The job-management system of claim 1, wherein:
    the interface component displays a supplemental form requesting supplemental input; and
    the saved data includes the supplemental input.

5. The job-management system of claim 4, wherein:
the supplemental form requests scheduling data, the scheduling data corresponding to a task to be performed at a selected time; and
the saved data includes the scheduling data.

6. The job-management system of claim 1, wherein the computer application is connected to a computer network and retrieves job data from the computer network.

7. The job-management system of claim 1, wherein the user interface includes a toolbar displayed within the application interface.

8. The job-management system of claim 1, wherein the computer application is a web browser;
wherein the instruction data is associated with a locally stored and locally executed browser extension configured to be executed by the web browser.

9. The job-management system of claim 8, wherein:
the web browser displays a first webpage including job data and a second webpage including the form; and
the interface component captures user input data entered by a user into the form on the second webpage.

10. The job-management system of claim 1, wherein the instruction data includes an organization component including computer executable instructions for using job data to index the saved data.

11. The job-management system of claim 1, wherein the data storage system includes a locally connected data storage device.

12. The job-management system of claim 1, further comprising:
a remote database connected to the processor through a computer network; and
the storage component stores the saved data to the database.

13. A computer implemented job-management system for adding employment seeking features to a computer application used for employment searching, the system comprising:
a data storage system storing saved data;
instruction data stored on a computer readable medium, the instruction data including:
a storage component including computer executable instructions for storing saved data to the data storage system after form input has been entered, the saved data including captured form input data entered in a job application form associated with a first online employment resource;
a retrieval component including computer executable instructions for retrieving saved data from the data storage system, the retrieval component configured to:
retrieve saved data corresponding to the first online employment resource when the computer application is currently accessing a second online employment resource; and
automatically enter the retrieved saved data corresponding to the first online employment resource in a job application form associated with the second online employment resource;
a recommendation component including computer executable instructions to generate recommended job opportunities based on the retrieved saved data; and
an interface component including computer executable instructions for interfacing with the computer application; and
a processor configured to execute the instruction data and the computer application.

14. The job-management system of claim 13, wherein the recommendation component includes computer executable instructions to communicate with a computer network to retrieve job data and to relate the retrieved job data with the saved data to generate recommended job opportunities or job-management related tasks.

15. A computer implemented job-management system for adding employment seeking features to a computer application used for employment searching, the system comprising:
a data storage system storing saved data;
instruction data stored on a computer readable medium, the instruction data including:
a storage component including computer executable instructions for storing saved data to the data storage system after form input has been entered, the saved data including:
captured form input data entered in a job application form associated with an online employment resource; and
scheduling data entered in a supplemental form associated with the online employment resource;
a retrieval component including computer executable instructions for retrieving saved data from the data storage system;
a reminder component including computer executable instructions for communicating a notification associated with the online employment resource at a selected time indicated by the scheduling data of the retrieved saved data; and
an interface component including computer executable instructions for interfacing with the computer application; and
a processor configured to execute the instruction data and the computer application.

16. A computer implemented job-management system for adding employment seeking features to a computer application configured to receive communication input and to send the communication input to an employer contact, the system comprising:
a data storage system storing saved data;
instruction data stored on a computer readable medium, the instruction data including:
an interface component including computer executable instructions for interfacing with the computer application to capture communication input intended for a first employer contact;
a storage component including computer executable instructions for storing saved data to the data storage system automatically upon sending the communication input, the saved data including the captured communication input intended for the first employer contact; and
a retrieval component including computer executable instructions for retrieving saved data from the data storage system; and
a processor configured to execute the instruction data;
wherein the interface component includes computer executable instructions for interfacing with the computer application to;
retrieve, with the retrieval component, the captured communication input intended for the first employer contact; and
automatically enter saved data as communication input intended for a second employer contact.

17. A computer implemented job-management system for adding employment seeking features to a web browser displaying an application interface, the web browser showing job data and a job application form for receiving form input, the job data and the job application form being associated with an online employment resource, the system comprising:
- a data storage system;
- instruction data stored on a computer readable medium, the instruction data including:
  - an interface component including computer executable instructions for:
    - interfacing with the web browser to capture:
      - form input entered into a page displayed in the web browser, the form input being entered by a user in the job application form associated with the online employment resource; and
      - job data from the web browser; and
    - displaying a user interface in the application interface; and
  - a storage component including computer executable instructions for storing saved data to the data storage system after form input has been entered, the saved data including captured form input entered in the job application form associated with the online employment resource; and
- a processor configured to execute the instruction data.

18. The system of claim 17, wherein:
- the instruction data includes instruction data associated with a locally stored and locally executed browser extension configured to be executed by the web browser;
- the instruction data associated with the locally stored and locally executed browser extension includes the interface component; and
- the interface component includes computer executable instructions for interfacing with the web browser to passively capture form input and job data.

19. The system of claim 18, wherein:
- the instruction data associated with the browser extension includes computer executable code for displaying a supplemental interface in response to the user entering the form input, the supplemental interface including a supplemental form requesting supplemental input; and
- the storage component is configured to automatically store the supplemental input entered in the supplemental form.

20. The system of claim 19, wherein:
- the supplemental input entered by the user in the supplemental form includes scheduling data associated with a future scheduled task; and
- the instruction data associated with the browser extension includes a reminder component including computer executable instructions configured to communicate a notification relating to the future scheduled task proximate a selected time associated with the future scheduled task.

21. The system of claim 18, wherein the instruction data associated with the browser extension includes a retrieval component configured to:
- retrieve saved data corresponding to the first online employment resource when the web browser is currently accessing a second online employment resource; and
- automatically enter the retrieved saved data corresponding to the first online employment resource in a job application form associated with the second online employment resource.

22. The system of claim 17, wherein the interface component includes computer executable instructions for interfacing with the web browser to passively capture form input and job data.

* * * * *